United States Patent
Beranek

(10) Patent No.: US 10,139,567 B1
(45) Date of Patent: Nov. 27, 2018

(54) DEMATABLE EXPANDED BEAM FIBER OPTIC CONNECTOR

(71) Applicant: Mark Beranek, Hollywood, MD (US)

(72) Inventor: Mark Beranek, Hollywood, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 12 days.

(21) Appl. No.: 15/728,666

(22) Filed: Oct. 10, 2017

(51) Int. Cl.
G02B 6/32 (2006.01)
G02B 6/38 (2006.01)

(52) U.S. Cl.
CPC ............. *G02B 6/32* (2013.01); *G02B 6/3821* (2013.01); *G02B 6/3882* (2013.01)

(58) Field of Classification Search
CPC ....... G02B 6/32; G02B 6/3821; G02B 6/3882
See application file for complete search history.

(56) References Cited

U.S. PATENT DOCUMENTS

| | | | | |
|---|---|---|---|---|
| 4,634,214 A * | 1/1987 | Cannon, Jr. | ......... | G02B 6/3818 385/80 |
| 4,712,861 A * | 12/1987 | Lukas | .................. | G02B 6/3823 385/58 |
| 4,747,656 A * | 5/1988 | Miyahara | ............. | G02B 6/3855 385/75 |
| 4,824,202 A * | 4/1989 | Auras | ...................... | G02B 6/32 385/92 |
| 4,991,929 A * | 2/1991 | Bowen | ................. | G02B 6/3818 385/50 |
| 5,257,332 A * | 10/1993 | Pimpinella | ............... | G02B 6/32 385/33 |
| 5,329,541 A * | 7/1994 | Brown | ................. | G02B 6/4296 372/88 |
| 5,337,386 A * | 8/1994 | Noll | ..................... | G02B 6/3893 385/60 |
| 5,574,815 A * | 11/1996 | Kneeland | ............ | G02B 6/3817 174/70 R |
| 5,640,478 A * | 6/1997 | Roller | .................. | G02B 6/3869 385/136 |
| 5,692,086 A * | 11/1997 | Beranek | ............... | G02B 6/4238 385/94 |
| 5,717,801 A * | 2/1998 | Smiley | ................. | G02B 6/3831 385/25 |

(Continued)

FOREIGN PATENT DOCUMENTS

EP 0992343 A1 * 4/2000 ........... B23K 26/073
WO WO 2004097988 A2 * 11/2004 ........... G02B 6/4292

(Continued)

OTHER PUBLICATIONS

Mark W. Beranek, "Fiber optic interconnect and optoelectronic packaging challenges for future generation avionics," Proc. SPIE 6478, Photonics Packaging, Integration, and Interconnects VII, 647809 (Feb. 14, 2007).*

(Continued)

*Primary Examiner* — Peter Radkowski
(74) *Attorney, Agent, or Firm* — Mark O. Glut; NAWCAD

(57) ABSTRACT

The present invention is directed to a dematable expanded beam fiber optic connector that is a fiber optic connector, that includes a pin housing, a receptacle housing, and a slidable spring loaded receptacle lens assembly.

4 Claims, 4 Drawing Sheets

(56) References Cited

U.S. PATENT DOCUMENTS

| | | | | |
|---|---|---|---|---|
| 5,745,624 A * | 4/1998 | Chan | G02B 6/4226 | 219/85.14 |
| 5,857,049 A * | 1/1999 | Beranek | G02B 6/4225 | 385/88 |
| 5,895,019 A * | 4/1999 | Ibarra | H05K 13/022 | 248/288.11 |
| 5,896,481 A * | 4/1999 | Beranek | G02B 6/4224 | 385/90 |
| 5,907,650 A * | 5/1999 | Sherman | G02B 6/3834 | 385/63 |
| 5,940,562 A * | 8/1999 | Henson | G02B 6/3885 | 385/88 |
| 6,007,255 A * | 12/1999 | Krauter | G02B 6/4298 | 362/551 |
| 6,024,004 A * | 2/2000 | Kosiarski | G02B 6/25 | 83/879 |
| 6,065,882 A * | 5/2000 | Roller | G02B 6/3814 | 385/136 |
| 6,164,837 A * | 12/2000 | Haake | G02B 6/4225 | 385/88 |
| 6,282,349 B1 * | 8/2001 | Griffin | G02B 6/3813 | 385/81 |
| 6,394,665 B1 * | 5/2002 | Hayashi | G02B 6/4201 | 385/37 |
| 6,409,391 B1 * | 6/2002 | Chang | G02B 6/3825 | 385/115 |
| 6,618,405 B2 * | 9/2003 | Kimura | G02B 6/4248 | 372/102 |
| 6,626,582 B2 * | 9/2003 | Farrar | G02B 6/3825 | 385/53 |
| 6,712,527 B1 * | 3/2004 | Chan | G02B 6/4201 | 385/88 |
| 6,932,517 B2 * | 8/2005 | Swayze | G02B 6/3869 | 385/62 |
| 7,031,567 B2 * | 4/2006 | Grinderslev | G02B 6/32 | 385/34 |
| 7,344,396 B2 * | 3/2008 | Stagi | H01B 7/285 | 439/204 |
| 7,442,045 B1 * | 10/2008 | Di Stefano | H01R 4/027 | 439/439 |
| 7,503,701 B2 * | 3/2009 | Hiereth | A61B 18/22 | 385/134 |
| 7,621,767 B2 * | 11/2009 | Stagi | H01B 7/285 | 439/204 |
| 7,658,629 B2 * | 2/2010 | Stagi | H01B 7/285 | 439/204 |
| 7,674,113 B2 * | 3/2010 | Di Stefano | H01R 4/027 | 439/66 |
| 7,722,261 B2 * | 5/2010 | Kadar-Kallen | G02B 6/32 | 385/72 |
| 7,853,144 B2 * | 12/2010 | Beranek | H01S 5/0683 | 356/73.1 |
| 8,023,784 B1 * | 9/2011 | Beranek | G01M 11/3154 | 385/138 |
| 8,419,293 B2 * | 4/2013 | Zerfas | G02B 6/4296 | 385/123 |
| 8,511,909 B2 * | 8/2013 | Kadar-Kallen | G02B 6/32 | 156/160 |
| 8,714,836 B2 * | 5/2014 | Daikuhara | G02B 6/3817 | 385/72 |
| 8,827,567 B2 * | 9/2014 | Grinderslev | G02B 6/3874 | 385/53 |
| 8,888,378 B2 * | 11/2014 | Zerfas | G02B 6/4296 | 385/76 |
| 9,057,847 B2 * | 6/2015 | Lin | G02B 6/3849 | |
| 9,329,350 B2 * | 5/2016 | Zerfas | G02B 6/4296 | |
| 9,393,081 B2 * | 7/2016 | Hiereth | A61B 18/22 | |
| 9,395,496 B2 * | 7/2016 | Byer | G02B 6/32 | |
| 9,429,713 B2 * | 8/2016 | Thornton, Jr. | A61B 5/0215 | |
| 9,465,173 B2 * | 10/2016 | Becker | H01R 13/5219 | |
| 9,660,757 B2 * | 5/2017 | Beranek | H04J 14/0282 | |
| 9,823,424 B2 * | 11/2017 | Krawczyk | G02B 6/383 | |
| 2002/0081871 A1 * | 6/2002 | Swayze | G02B 6/3869 | 439/76.1 |
| 2007/0049085 A1 * | 3/2007 | Stagi | H01B 7/285 | 439/199 |
| 2008/0050073 A1 * | 2/2008 | Kadar-Kallen | G02B 6/32 | 385/79 |
| 2008/0124962 A1 * | 5/2008 | Stagi | H01B 7/285 | 439/199 |
| 2008/0156508 A1 * | 7/2008 | Stagi | H01B 7/285 | 174/15.6 |
| 2008/0246957 A1 * | 10/2008 | Beranek | G02B 6/4203 | 356/73.1 |
| 2008/0260379 A1 * | 10/2008 | Beranek | G01M 11/37 | 398/21 |
| 2009/0060529 A1 * | 3/2009 | Beranek | H01S 5/0683 | 398/197 |
| 2009/0068858 A1 * | 3/2009 | Di Stefano | H01R 4/027 | 439/66 |
| 2009/0305523 A1 * | 12/2009 | Di Stefano | H01R 4/027 | 439/66 |
| 2010/0189395 A1 * | 7/2010 | Kadar-Kallen | G02B 6/32 | 385/74 |
| 2010/0247043 A1 * | 9/2010 | Sugawara | G02B 6/4201 | 385/93 |
| 2011/0229076 A1 * | 9/2011 | Beranek | G01M 11/3154 | 385/33 |
| 2013/0039622 A1 * | 2/2013 | Grinderslev | G02B 6/3874 | 385/61 |
| 2013/0084042 A1 * | 4/2013 | Bouchard | G02B 6/3849 | 385/78 |
| 2013/0093184 A1 * | 4/2013 | Peirce | B25B 27/10 | 285/323 |
| 2015/0374207 A1 * | 12/2015 | Fukuoka | A61B 1/00126 | 600/110 |
| 2016/0365941 A1 * | 12/2016 | Beranek | H04J 14/0282 | |
| 2017/0052329 A1 * | 2/2017 | Grinderslev | G02B 6/3846 | |
| 2017/0160486 A1 * | 6/2017 | Krawczyk | G02B 6/383 | |
| 2017/0285276 A1 * | 10/2017 | Altshuler | G02B 6/3882 | |

FOREIGN PATENT DOCUMENTS

| | | | | |
|---|---|---|---|---|
| WO | WO 2005119319 A2 * | 12/2005 | | G02B 6/3891 |
| WO | WO 2010124165 A1 * | 10/2010 | | G02B 6/3817 |
| WO | WO 2013126529 A2 * | 8/2013 | | A61F 2/2418 |
| WO | WO 2014151927 A1 * | 9/2014 | | G02B 6/32 |

OTHER PUBLICATIONS

M. W. Beranek, "Future generation military avionics fiber optics photonics packaging challenges," 2007 IEEE/AIAA 26th Digital Avionics Systems Conference, Dallas, TX, 2007, pp. 2.A.6-1-2.A.6-10.*

Michael D. Orr, Jim T. Hartley, Mark W. Beranek, Eric Y. Chan, Harold E. Hager, Chi-Shain Hong, "Universal detachable optical connector for military and commercial aerospace fiber optic modules," Proc. SPIE 2691, Optoelectronic Packaging, (Mar. 29, 1996).*

SBIR Source available at: https://sbirsource.com/sbir/people/78682-mark-beranek, 2018.*

Navy SBIR—NAVAIR—2015—Multi-Wavelength and Built-in Test Capable Local Area Network Node Packaging, 2015, available at http://www.navysbir.com/n15_2/N152-090.htm.*

NAVAIR News, 2012, available at http://www.navair.navy.mil/index.cfm?fuseaction=home.NAVAIRNewsStory&id=5101.*

AVFOP2018—Avionics and Vehicle Fiber-optics and Phtonics Conference, 2018—available at http://ieee-avfop.org/2018-organizing-committee/.*

Navy SBIR—2009, Multichannel Fiber Optic Package Interface for Avionics, 2009. http://www.navysbir.com/n09_1/N091-039.htm.*

Navy—NAVSEA—Fiber Optic Component—2016.*

SPIE Profile—Mark W. Beranek—2018, available at https://www.spiedigitallibrary.org/profile/Mark.Beranek-7538.*

* cited by examiner ns of the

DEMATABLE EXPANDED BEAM FIBER OPTIC CONNECTOR

STATEMENT OF GOVERNMENT INTEREST

The invention described herein may be manufactured and used by or for the Government of the United States of America for governmental purposes without payment of any royalties thereon or therefor.

BACKGROUND

Currently, the United States Navy uses standard connectors on fiber optic connector interfaces. These connectors, as well as other connectors, are difficult to inspect and clean, especially in an operational (fleet maintenance environment). Current proposals to fix this issue include a physical contact array connector and noncontact connectors. Neither types of connectors are designed for maintainability or meet U.S. Navy and Department of Defense interoperability needs.

SUMMARY

The present invention is directed to a dematable expanded beam fiber optic connector that is a fiber optic connector, that includes a pin housing, a receptacle housing, and a slidable spring loaded receptacle lens assembly.

The present invention is directed to a dematable expanded beam fiber optic connector that allows easy cleaning and inspection.

It is a feature of the present invention to provide a dematable expanded beam fiber optic connector that is maintainable, readily cleanable, and keeps external contaminants away from its optical surfaces.

It is a feature of the present invention to provide a connector that is readily cleanable in a tight working space application environment. Applications include fiber optic backplanes, blind-mate equipment rack connections, and store and sensor interfaces. By eliminating the use of connector guide pins and guide pin sockets, and providing a relatively flat connector mating surface, the connector optical interface is readily cleanable using standard cleaning instruments and materials.

Additionally, the present invention provides sealing gasket(s) which prevent contaminants from entering any of the dematable connector optical interfaces.

DRAWINGS

These and other features, aspects and advantages of the present invention will become better understood with reference to the following description and appended claims, and accompanying drawings wherein:

DESCRIPTION

Figure 1:
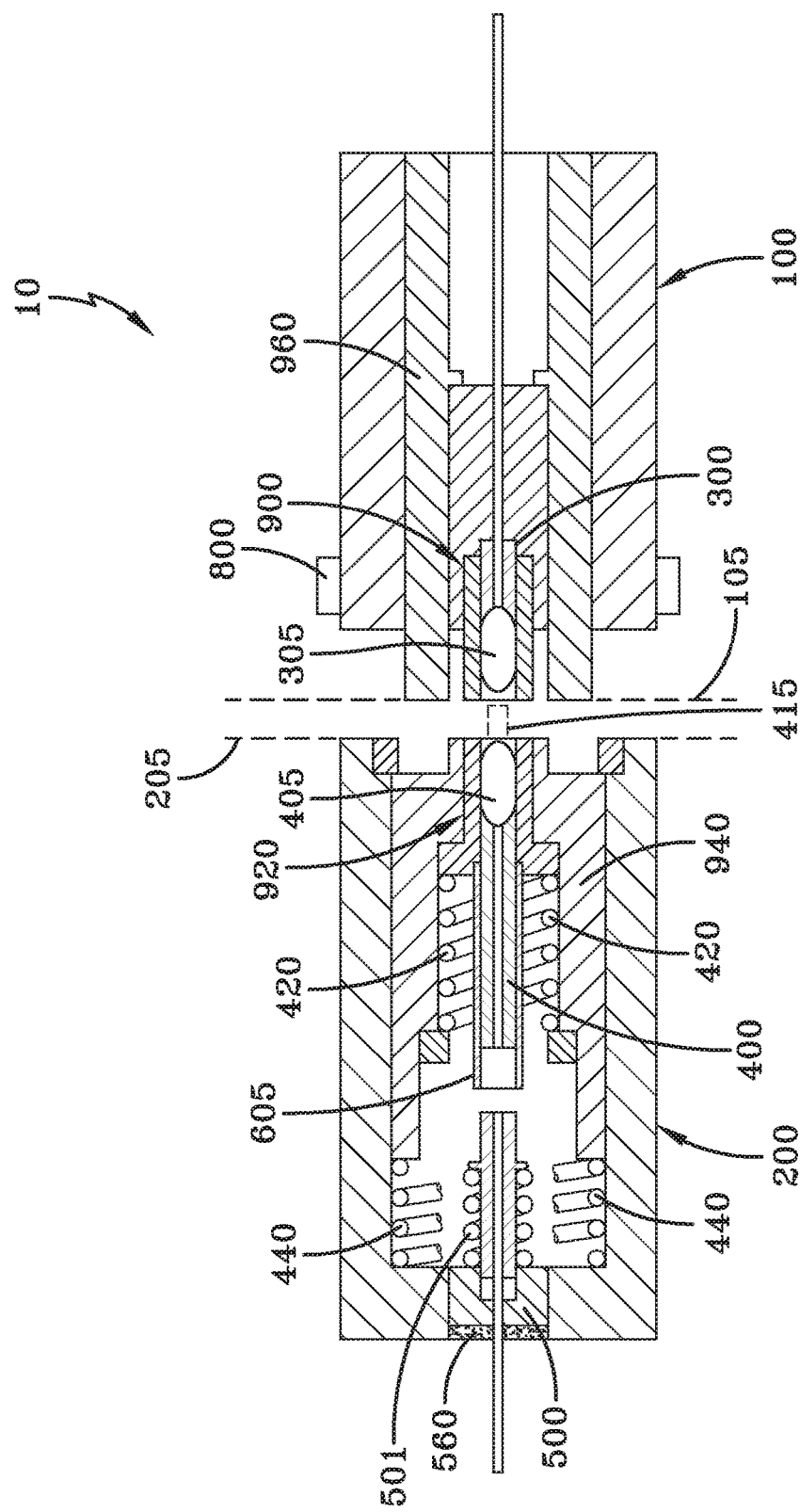
FIG. 1 is a cross sectional view of an embodiment of the de able expanded beam fiber optic connector in the demated position.
Figure 2:
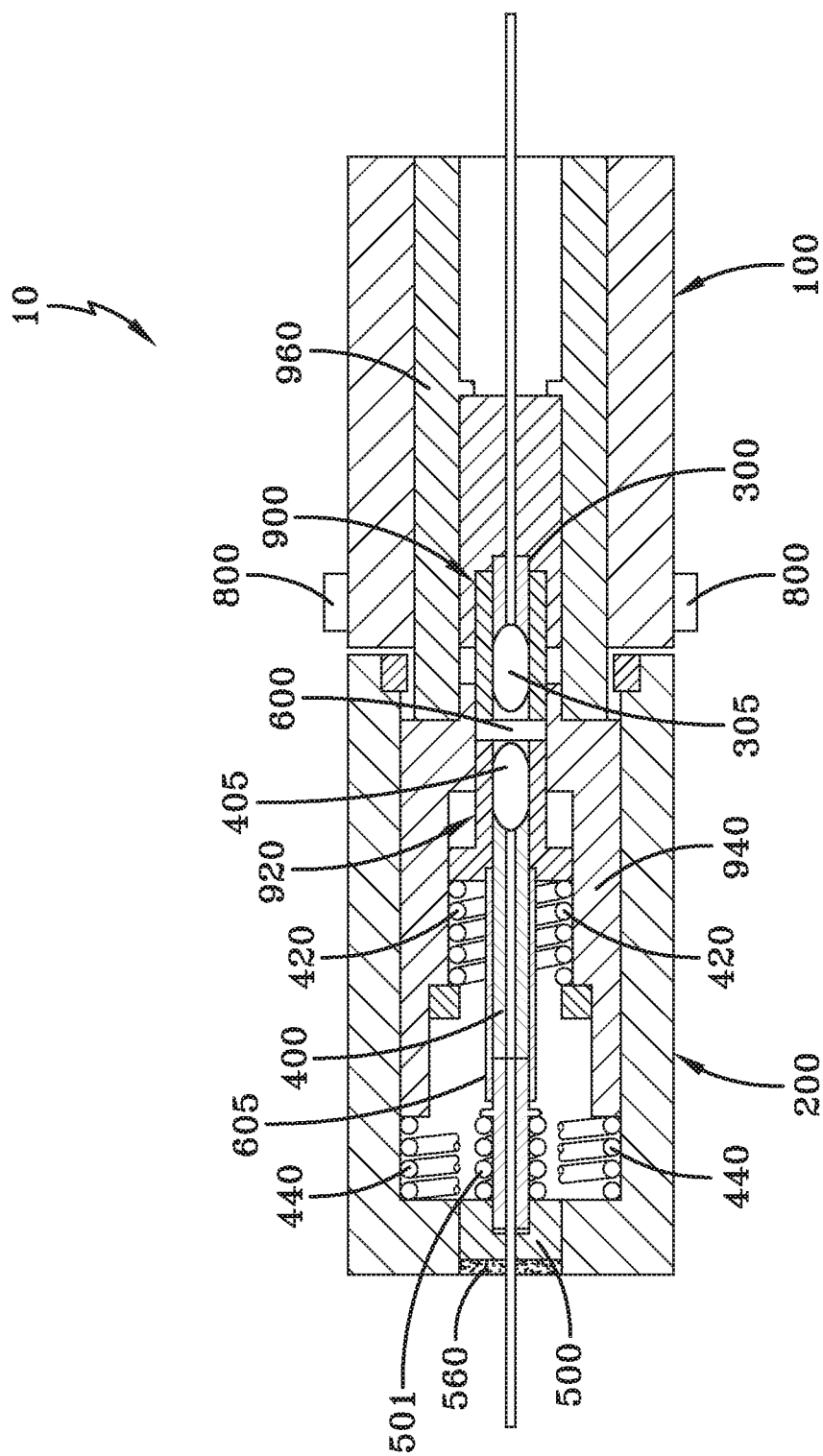
FIG. 2 is a cross sectional view of an embodiment of the dematable expanded beam fiber optic connector in the mated position.

The preferred embodiments of the present invention are illustrated by way of example below and as shown in FIG. 1-5. As shown in FIGS. 1 and 2, a dematable expanded beam fiber optic connector 10 comprises of a pin housing 100 including a pin plane 105, a receptacle housing 200 including a receptacle plane 205, a non-spring loaded pin lens sleeve assembly 300 extending from the pin housing 100 and partially disposed within the pin housing 100 and communicating with a board connector (not shown), and a slidable spring loaded receptacle lens assembly 400. The non-spring loaded pin lens sleeve assembly 300 includes a pin sleeve expanded beam lens terminus 305 for optical communication. The slidable spring loaded receptacle lens assembly 400 is disposed within the receptacle housing 200, and includes a receptacle expanded beam lens terminus 405 containing a lens for relaying a collimated beam 415 of light between the pin sleeve expanded beam terminus 305 and the receptacle expanded beam lens terminus 405. The slidable spring loaded receptacle lens assembly 400 further includes a receptacle spring 420 for applying force such that the slidable spring loaded receptacle lens assembly 400 is flush with the receptacle plane 205 when it is not in use (as shown in FIG. 1 in an unmated state). The slidable spring loaded receptacle lens assembly 400 can optically communicate with the non-spring loaded pin lens sleeve assembly 300 such that when the non-spring loaded pin lens sleeve assembly 300 is mated to the slidable spring loaded receptacle lens assembly 400 (as shown in FIG. 2), a receptacle spring 420 compresses and allows protected optical communication between the receptacle expanded beam lens terminus 405 and the pin sleeve expanded beam lens terminus 305, and further causing the slidable spring loaded receptacle lens assembly 400 to communicate with a fiber optic ferrule assembly 500 that communicates with end nodes (not shown) of an optical backplane (not shown).

In the description of the present invention, the invention will be discussed in a military environment; however, this invention can be utilized for any type of application that utilizes a fiber optic connector.

Figure 3:
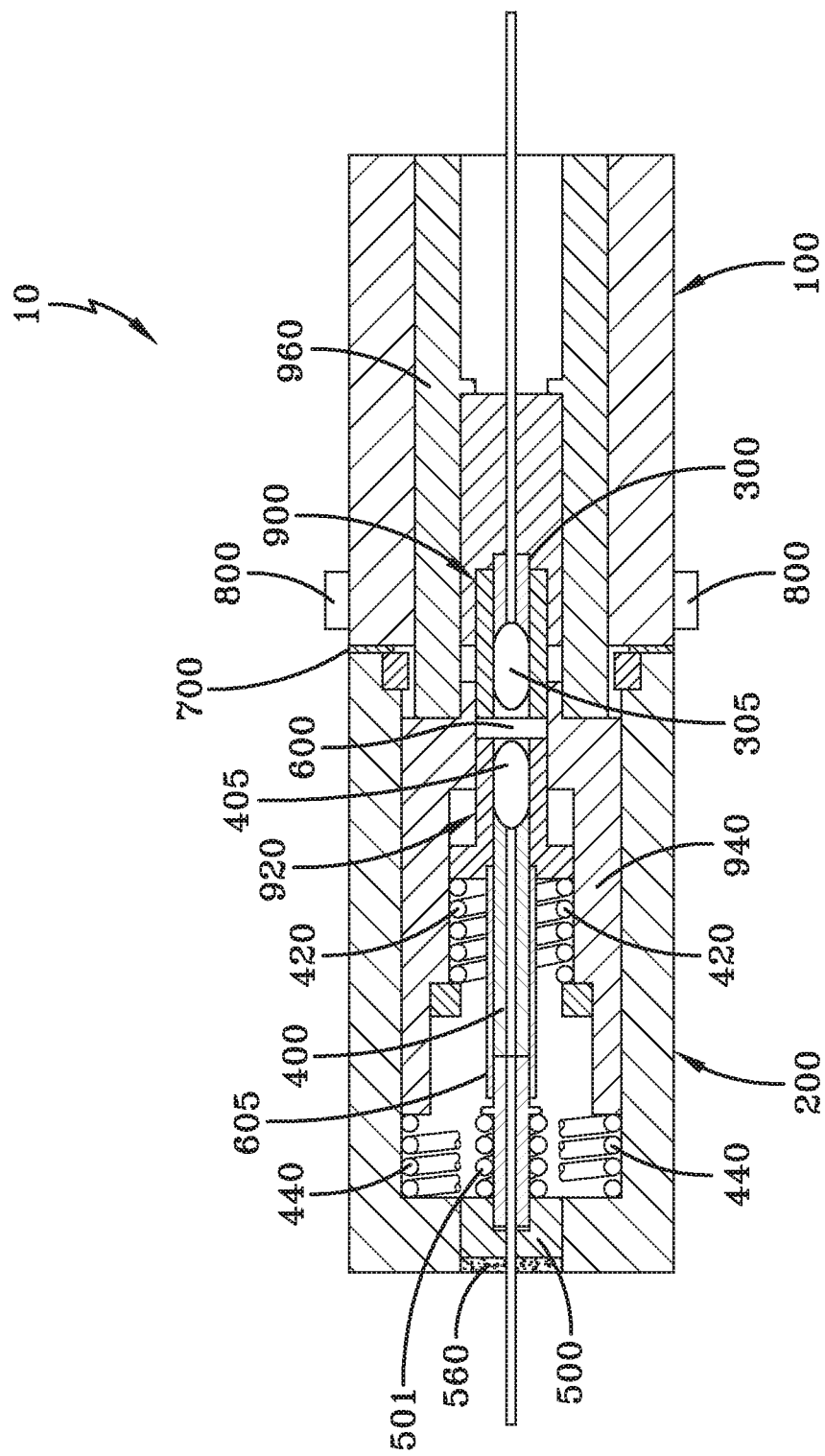
FIG. 3 is a cross sectional view of an embodiment of the dematable expanded beam fiber optic connector in the mated position.

In another embodiment of the invention, the dematable expanded beam fiber optic connector 10, as show in FIGS. 1-3, further includes a receptacle lens assembly holder 940, wherein the slidable spring loaded receptacle lens assembly 400 is disposed within the receptacle lens assembly holder 940. Additionally, there is a holder spring 440 for applying force such that the receptacle lens assembly holder 940 is flush with the receptacle plane 205 and the slidable spring loaded receptacle lens assembly 400 when the dematable expanded beam fiber optic connector 10 is not use. The dematable expanded beam fiber optic connector 10 also includes a pin lens sleeve assembly holder 960 for holding the non-spring loaded pin, lens sleeve assembly 300.

Figure 4:
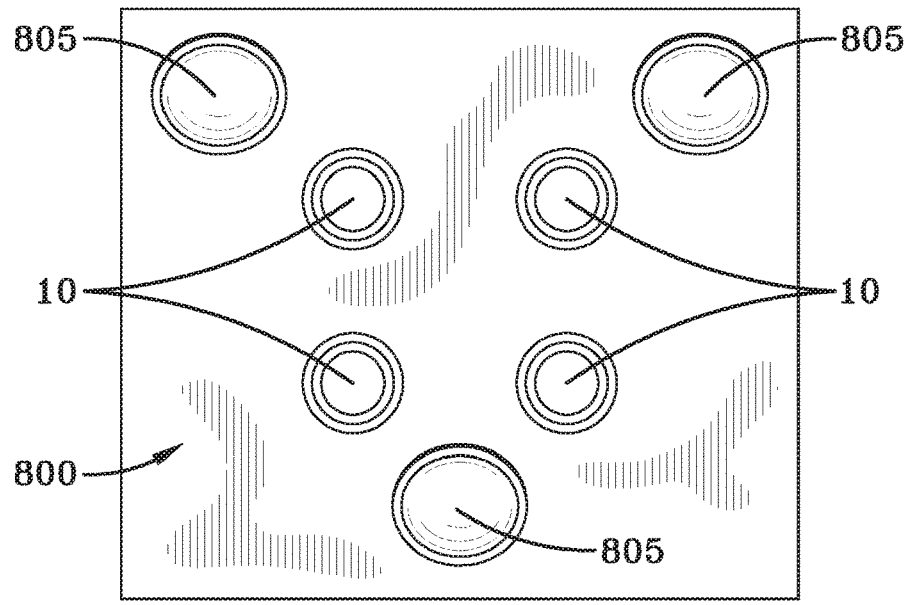
FIG. 4 is a cross sectional view of an embodiment of part of the ball-bearing dimple apparatus; and, FIG. 5 is a cross sectional view of an embodiment of the corresponding the ball-bearing dimple apparatus.
Figure 5:
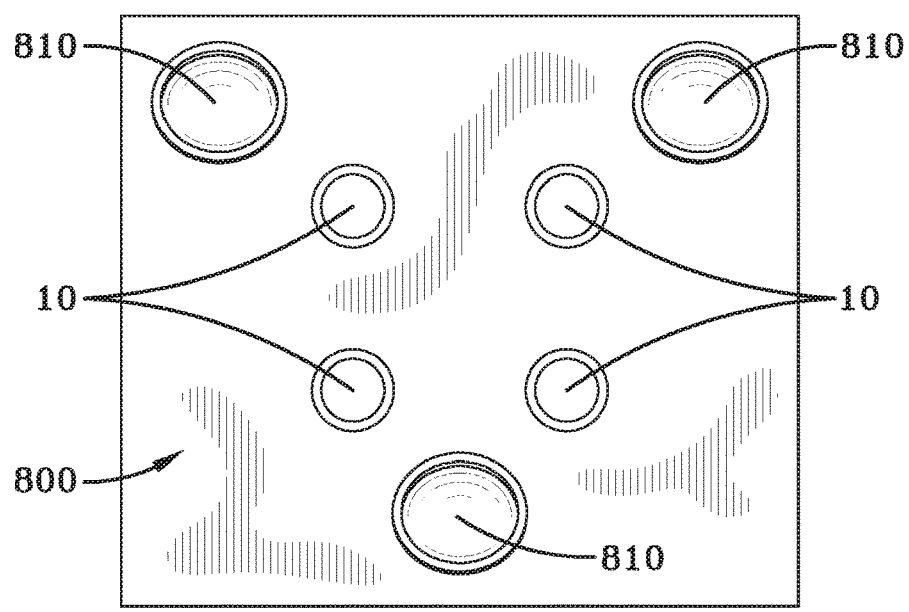

In the preferred embodiment, as shown in FIGS. 1 and 2, the fiber optic assembly 500 includes a fiber optic ferrule assembly spring 501 to provide physical contact force between the fiber optic ferrule assembly 500 and the slidable spring loaded receptacle lens assembly 400. The non-spring loaded pin lens sleeve assembly 300 and the slidable spring loaded receptacle lens assembly 400 form an optical interface 600, and the dematable expanded beam fiber optic connector 10 further includes a gasket 700 (shown in FIG. 3) wherein the gasket 700 protects the optical interface 600 from external contaminants. Additionally, in the preferred embodiment of the invention, the dematable expanded beam fiber optic connector 10 further includes a ball bearing-dimple apparatus 800 such that the non-spring loaded pin lens sleeve assembly 300 and the slidable spring loaded receptacle lens assembly 400 can be easily mated and cleaned. The ball bearing-dimple apparatus 800 can include at least 3 ball bearings 805 on either the non-spring loaded pin lens sleeve assembly 300 or the slidable spring loaded receptacle lens assembly 400, with a corresponding dimple 810 on the other assembly (element 300 or 400). As shown in FIGS. 4 and 5, the dematable expanded beam fiber optic connector 10 may be disposed within the ball-bearing dimple apparatus 800 and may include multiple connectors 10 in the ball-bearing dimple apparatus 800.

In one of the embodiments of the invention, the fiber optic ferrule assembly 500 contains a ferrule assembly gasket 560 to protect the slidable spring loaded receptacle lens assembly 400 and the fiber optic ferrule assembly 500 optical interface from external contaminants.

In another one of the embodiments of the invention, the non-spring loaded pin lens sleeve assembly 300 and the slidable spring loaded receptacle lens assembly 400 are axially aligned. Two (or more) elements are axially aligned when the axes of each element are put end to end, they form a substantially straight line. In addition, the invention may include a pin alignment sleeve 900 and a receptacle alignment sleeve 920. The pin alignment sleeve 900 envelops the non-spring loaded pin lens sleeve assembly 300, while the receptacle alignment sleeve 920 envelops the slidable spring loaded receptacle lens assembly 400 and may optionally envelop the fiber optic ferrule assembly 500. The pin alignment sleeve 900 and the receptacle alignment sleeve 920 may be axially aligned. In another embodiment, the dematable expanded beam fiber optic connector 10 includes a guide 605 for aligning the fiber optic ferrule assembly 500 and the slidable spring loaded receptacle lens assembly 400 such that optical communication between the fiber optic ferrule assembly 500 and the slidable spring loaded receptacle lens assembly 400 occurs.

When introducing elements of the present invention or the preferred embodiment(s) thereof, the articles "a," "an," "the," and "said" are intended to mean there are one or ore of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A dematable expanded beam fiber optic connector comprising:
   a pin housing including a pin plane;
   a receptacle housing including a receptacle plane;
   a non-spring loaded pin lens sleeve assembly extending from the pin housing and partially disposed within the pin housing and communicating with a board connector, the non-spring loaded pin lens sleeve assembly comprising a pin sleeve expanded beam lens terminus for optical communication;
   a slidable spring loaded receptacle lens assembly disposed within the receptacle housing, and comprising a receptacle expanded beam lens terminus containing a lens for relaying a collimated beam of light between the pin sleeve expanded beam lens terminus and the receptacle expanded beam lens terminus, the slidable spring loaded receptacle lens assembly includes a receptacle spring for applying force such that the slidable spring loaded receptacle lens assembly is flush with the receptacle plane when not in use, the slidable spring loaded receptacle lens assembly can optically communicate with the non-spring loaded pin lens sleeve assembly such that when the non-spring loaded pin lens sleeve assembly is mated to the slidable spring loaded receptacle lens assembly, the receptacle spring compresses and allows protected optical communication between the receptacle expanded beam lens terminus and the pin sleeve expanded beam lens terminus, causing the slidable spring loaded receptacle lens assembly to communicate with a fiber optic ferrule assembly that communicates with end nodes of an optical back plane, the fiber optic ferrule assembly which includes a fiber optic ferrule assembly spring to provide physical contact force between the fiber optic ferrule assembly and the slidable spring loaded receptacle lens assembly;
   a receptacle lens assembly holder, wherein the slidable spring loaded receptacle lens assembly is disposed within the receptacle lens assembly holder; and,
   a holder spring far applying force such that the receptacle lens assembly holder is flush with the receptacle plane and the slidable spring loaded receptacle lens assembly when the dematable expanded beam fiber optic connector is not in use.

2. The dematable expanded beam fiber optic connector of claim 1, wherein the fiber optic ferrule assembly includes a fiber optic ferrule assembly spring to provide physical contact force between the fiber optic ferrule assembly and the slidable spring loaded receptacle lens assembly.

3. The dematable expanded beam fiber optic connector of claim 2, wherein the non-spring loaded pin lens sleeve assembly and the slidable spring loaded receptacle lens assembly form an optical interface, and the dematable expanded beam fiber optic connector further includes a gasket wherein the gasket protects the optical interface from external contaminants.

4. The dematable expanded beam fiber optic connector of claim 3, wherein the dematable expanded beam fiber optic connector further includes a ball bearing-dimple apparatus such that the pin sleeve expanded beam lens terminus and the slidable spring loaded receptacle lens assembly can be easily mated and cleaned.

* * * * *